(12) United States Patent
Vick et al.

(10) Patent No.: US 11,934,286 B2
(45) Date of Patent: Mar. 19, 2024

(54) SUBSYSTEM POWER RANGE CONFIGURATION BASED ON WORKLOAD PROFILE

(71) Applicant: Dell Products L.P., Round Rock, TX (US)

(72) Inventors: Jacob Vick, Leander, TX (US); Michael James Pescetto, Round Rock, TX (US); Philip Joseph Grossmann, Austin, TX (US); Travis C. North, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 366 days.

(21) Appl. No.: 17/243,702

(22) Filed: Apr. 29, 2021

(65) Prior Publication Data
US 2022/0350667 A1    Nov. 3, 2022

(51) Int. Cl.
*G06F 11/30* (2006.01)

(52) U.S. Cl.
CPC .. *G06F 11/3058* (2013.01); *G06F 2209/5022* (2013.01)

(58) Field of Classification Search
CPC ......... G06F 11/3058; G06F 2209/5022; G06F 1/324; G06F 1/3243; G06F 1/3296; G06F 11/3062; G06F 11/3409; G06F 1/329
See application file for complete search history.

(56) References Cited

U.S. PATENT DOCUMENTS

| | | | |
|---|---|---|---|
| 9,557,792 B1* | 1/2017 | Potlapally | G06F 1/3206 |
| 2009/0109230 A1* | 4/2009 | Miller | G06F 9/5044 |
| | | | 345/506 |
| 2011/0010566 A1* | 1/2011 | Bandholz | G06F 1/3203 |
| | | | 713/300 |
| 2014/0089699 A1* | 3/2014 | O'Connor | G09G 5/363 |
| | | | 713/300 |
| 2014/0143565 A1* | 5/2014 | Paul | G06F 1/3206 |
| | | | 713/320 |
| 2016/0357232 A1* | 12/2016 | Kalyanasundaram | |
| | | | G06F 1/3296 |
| 2018/0284868 A1* | 10/2018 | Koker | G06F 1/3209 |
| 2019/0163250 A1* | 5/2019 | Lee | G06F 1/3206 |

(Continued)

*Primary Examiner* — Benjamin C Wu
(74) *Attorney, Agent, or Firm* — Joseph Mencher

(57) ABSTRACT

A processing system concurrency optimization system includes a processing system having first and second processing subsystems, a power system that is coupled to the first and second processing subsystems, a processing system concurrency optimization database, and a processing system concurrency optimization subsystem that is coupled to the power system and the processing system concurrency optimization database. The processing system concurrency optimization subsystem determines that a first workload has been provided for performance by the processing system, and identifies a first processing system concurrency optimization profile that is associated with the first workload in the processing system concurrency optimization database. Based on the first processing system concurrency optimization profile, the processing system concurrency optimization subsystem configures the power system to provide first power in a first power range to the first processing subsystem and second power in a second power range to the second processing subsystem.

20 Claims, 9 Drawing Sheets

(56) References Cited

U.S. PATENT DOCUMENTS

| | | | |
|---|---|---|---|
| 2019/0163540 A1* | 5/2019 | Lee | G06F 9/5077 |
| 2019/0235605 A1* | 8/2019 | Chenchev | G06F 9/44505 |
| 2019/0377395 A1* | 12/2019 | Kaburlasos | G06F 1/3206 |
| 2021/0303045 A1* | 9/2021 | Leung | G06F 1/26 |
| 2021/0397476 A1* | 12/2021 | Liu | G06F 11/3062 |
| 2022/0253124 A1* | 8/2022 | Venkataraman | G06F 1/3206 |

* cited by examiner

| | | HIGH CPU MODE 402a | CPU MODE 402b | BALANCED MODE 402c | GPU MODE 402d | HIGH GPU MODE 402e |
|---|---|---|---|---|---|---|
| CENTRAL PROCESSING SUBSYSTEM 204 | MAX CLOCK SPEEDS/OC | 110% | 105% | 100% | 95% | 90% |
| | AVERAGE POWER | 120% | 110% | 100% | 90% | 80% |
| | PEAK POWER | 120% | 110% | 100% | 90% | 80% |
| | TEMP. CEILING | 100% | 100% | 100% | 95% | 90% |
| | OS BIAS: EPP/PPM | 100% | 90% | 80% | 70% | 60% |
| GRAPHICS PROCESSING SUBSYSTEM 206 | MAX CLOCK SPEEDS/OC | 90% | 95% | 100% | 105% | 110% |
| | AVERAGE POWER | 80% | 90% | 100% | 110% | 120% |
| | PEAK POWER | 80% | 90% | 100% | 110% | 120% |
| | TEMP. CEILING | 90% | 95% | 100% | 100% | 100% |

PROCESSING SYSTEM CONCURRENCY OPTIMZATION DATABASE 500

FIG. 5

| | PERFORMANCE MODE 602a | BALANCED MODE 602b | LOW POWER MODE 602c | QUIET MODE 602d | FULL-SPEED MODE 602e |
|---|---|---|---|---|---|
| TARGETS 604a | ACOUSTIC LIMIT | | | | |
| | MAX SURFACE TEMPERATURE | | | | |
| | MIN CPU POWER | | | | |
| DTT SETTINGS 604b | CPU/GPU PRIORITY | | | | |
| | CPU TARGET POWER SETTING | | | | |
| | GPU THROTTLE TEMPERATURE | | | | |
| | GPU VR THROTTLE TEMP | | | | |
| BOOST 604c | BOOST AVAILABILITY | | | | |
| | TOTAL PLATFORM POWER | | | | |

PROCESSING SYSTEM CONCURRENCY OPTIMZATION DATABASE 600

FIG. 6A

| | PERFORMANCE MODE 602a | BALANCED MODE 602b | LOW POWER MODE 602c | QUIET MODE 602d | FULL-SPEED MODE 602e |
|---|---|---|---|---|---|
| ENABLE/DISABLE | N/A | N/A | | | N/A |
| ACOUSTIC LIMIT | N/A | N/A | | | N/A |
| CPU POWER FORCE POINT | N/A | N/A | | | |
| FRAMES PER SECOND | | | | | |
| CPU PREFERENCE | | | | | |
| QUIET MODE 604d | | | | | |
| SPEED SHIFT 604e | | | | | |

PROCESSING SYSTEM CONCURRENCY OPTIMZATION DATABASE 600

FIG. 6B

SUBSYSTEM POWER RANGE CONFIGURATION BASED ON WORKLOAD PROFILE

BACKGROUND

The present disclosure relates generally to information handling systems, and more particularly to optimizing processing system concurrency in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems include multiple processing systems that may operate concurrently (referred to below as "processing system concurrency"). For example, desktop computing devices and/or laptop/notebook computing devices utilized to provide gaming applications will typically include a central processing system (e.g., including one or more Central Processing Units (CPUs) or CPU cores) and a graphics processing system (e.g., including one or more Graphics Processing Units (GPUs) or GPU cores) that may be capable of performing computations at the same time. Such CPU/GPU concurrency can present issues with the performance of some gaming applications, as some gaming applications tend to overutilize the CPU even when doing so does not add value (e.g., by not adding value in the form of enhancing graphics results such as Frames Per Second (FPS) or refresh rate), while other gaming applications (e.g., Virtual Reality (VR) or Augmented Reality (AR)) tend to overutilize the GPU while underutilizing the CPU. Conventional CPU/GPU concurrency systems offer relatively little in terms of control of the concurrent operations of the CPU and GPU, and tend to operate by providing a static CPU/GPU concurrency configuration that attempts to satisfy the largest number of use cases, leaving use cases that do not operate optimally using that CPU/GPU concurrency configuration to suffer from limited performance.

Accordingly, it would be desirable to provide a processing system concurrency optimization system that addresses the issues discussed above.

SUMMARY

According to one embodiment, an Information Handling System (IHS) includes a processing system including: a first processing subsystem; and a second processing subsystem; and a memory system that is coupled to the processing system and that includes instructions that, when executed by the processing system, cause the processing system to provide a processing system concurrency optimization engine that is configured to: determine that a first workload has been provided for performance by the processing system; identify a first processing system concurrency optimization profile that is associated with the first workload in a processing system concurrency optimization database; and configure, based on the first processing system concurrency optimization profile, a power system to provide first power in a first power range to the first processing subsystem and second power in a second power range to the second processing system

BRIEF DESCRIPTION OF THE DRAWINGS

FIG. 5 is a schematic view illustrating an embodiment of a processing system concurrency optimization database that may be provided in the computing device of FIG. 2 during the method of FIG. 3.

FIG. 6A is a schematic view illustrating an embodiment of a processing system concurrency optimization database that may be provided in the computing device of FIG. 2 during the method of FIG. 3.

FIG. 6B is a schematic view illustrating an embodiment of a processing system concurrency optimization database that may be provided in the computing device of FIG. 2 during the method of FIG. 3.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
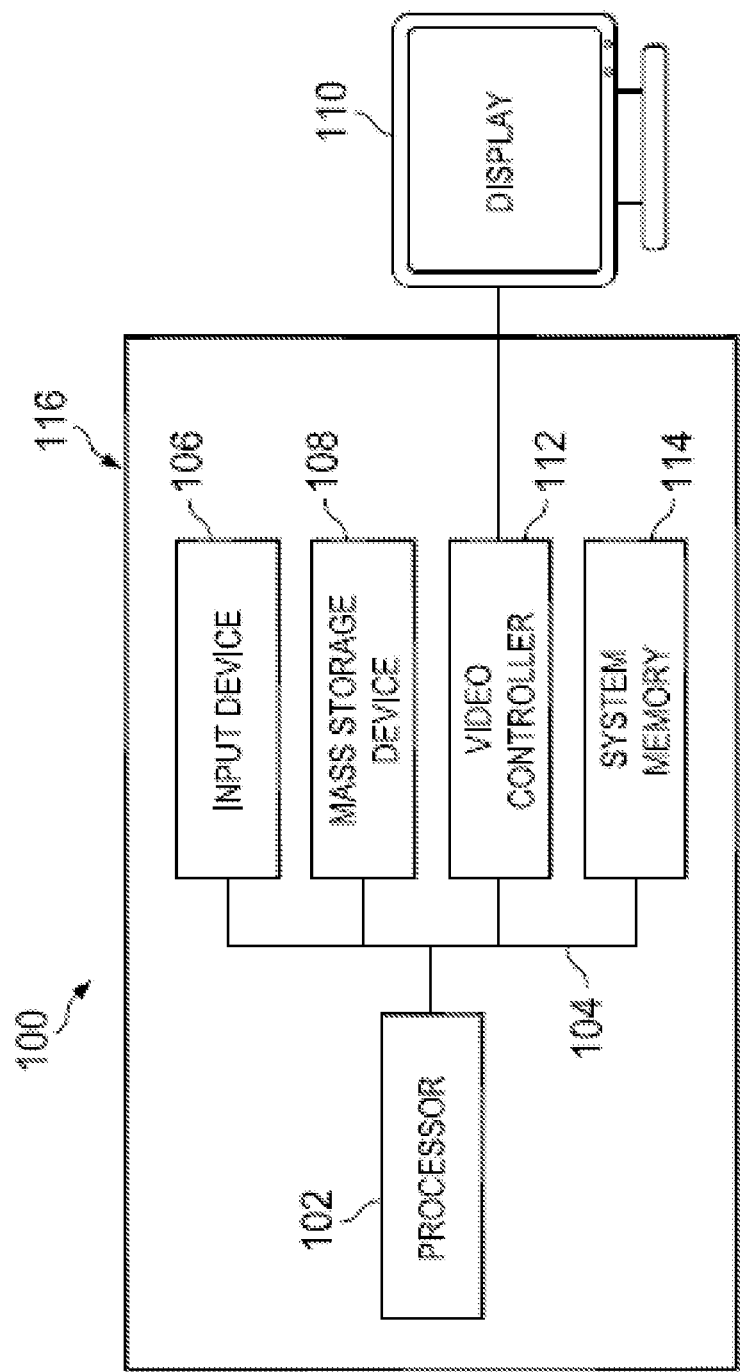
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
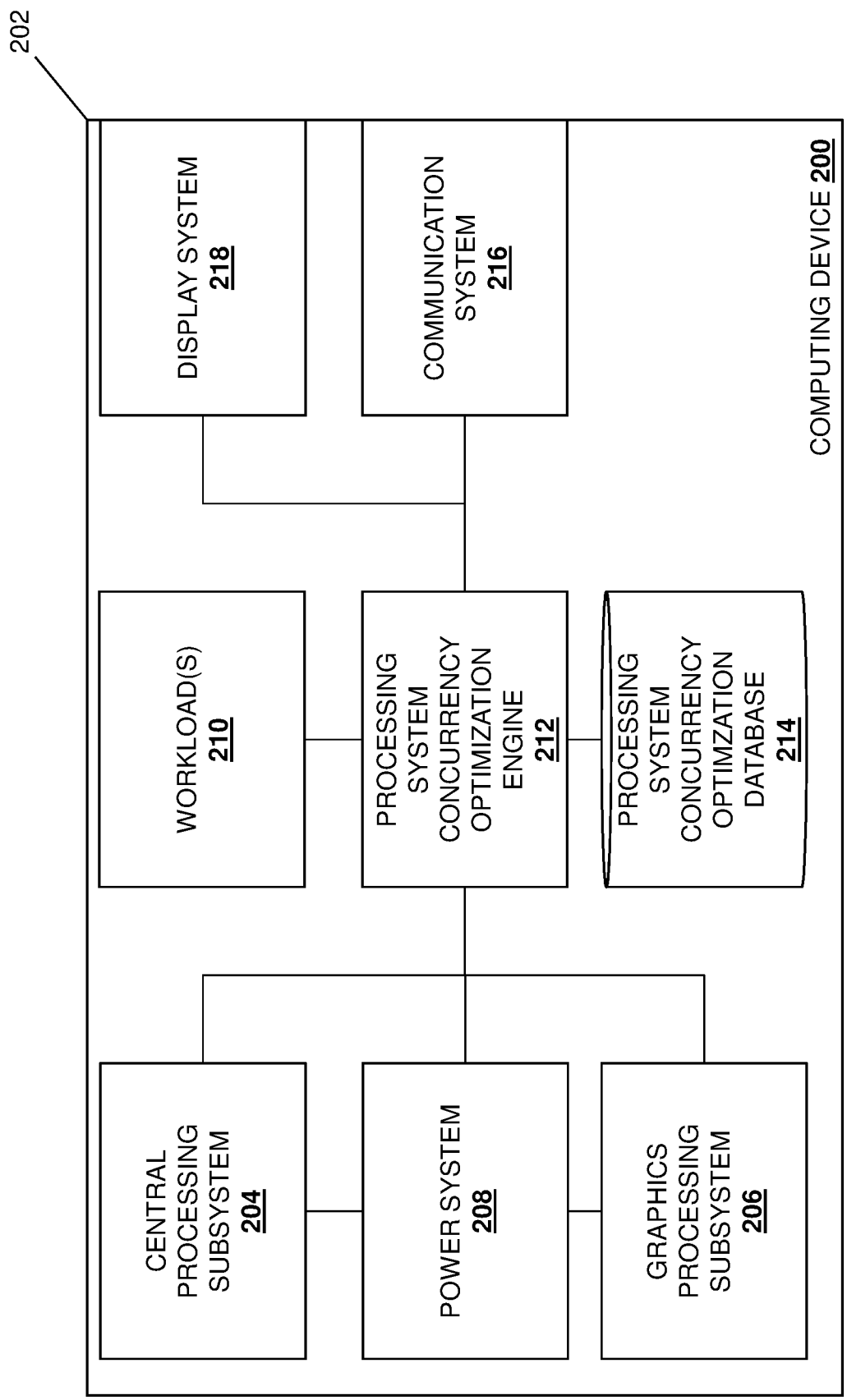
FIG. 2 is a schematic view illustrating an embodiment of a computing device that may utilize the processing system concurrency optimization system of the present disclosure.

Referring now to FIG. 2, an embodiment of a computing device 200 is illustrated that may utilize the processing system concurrency optimization system of the present disclosure. In an embodiment, the computing device 200 may be provided by the IHS 100 discussed above with reference to FIG. 1 and/or may include some or all of the components of the IHS 100, and in specific examples may be provided by a desktop computing device or a laptop/notebook computing device that is configured to perform workloads such as gaming applications. For example, the inventors of the present disclosure describe a computing device that may provide the computing device 200 in U.S. patent application Ser. No. 17/243,443, filed on Apr. 28, 2021; U.S. patent application Ser. No. 17/243,488, filed on Apr. 28, 2021, and U.S. patent application Ser. No. 17/243, 525, filed on Apr. 28, 2021, the disclosures of which are incorporated by reference herein in their entirety. However, while illustrated and discussed as being provided by desktop computing devices or laptop/notebook computing devices performing gaming applications, one of skill in the art in possession of the present disclosure will recognize that the functionality of the computing device 200 discussed below may be provided by other devices that are configured to operate similarly as the computing device 200 discussed below to provide a variety of workloads that would be apparent to one of skill in the art in possession of the present disclosure.

In the illustrated embodiment, the computing device 200 includes a chassis 202 that houses the components of the computing device 200, only some of which are illustrated below. For example, the chassis 202 may house a processing system that includes multiple processing subsystems (e.g., one or more of the processor 102 discussed above with reference to FIG. 1). In the specific examples illustrated and discussed below, the processing system is provided by a central processing subsystem 204 that may include one or more Central Processing Units (CPUs), and a graphics processing subsystem 206 that may include one or more Graphics Processing Units (GPUs). However, while the processing subsystems are illustrated and discussed as being provided by CPU(s) and GPU(s), one of skill in the art in possession of the present disclosure will recognize that the different processing subsystems in the processing system may be provided by different CPUs, different GPUs, different processor cores, different accelerators (e.g., task-specific silicon-based devices), and/or any other processing subsystems that would be apparent to one of skill in the art in possession of the present disclosure. Furthermore, one of skill in the art in possession of the present disclosure will appreciate how the concurrent operations of computing components other than processing systems (e.g., lighting devices, peripheral devices, display devices, charging subsystems, etc.) may be dynamically configured using the teachings of the present disclosure while remaining within its scope.

In the illustrated embodiment, a chassis 202 may also house a power system 208 that is coupled to each of the central processing subsystem 204 and the graphics processing subsystem 206. For example, the power system 208 may be provided by one or more Power Supply Units (PSUs), power adapter(s), and/or any other power components that would be apparent to one of skill in the art in possession of the present disclosure, and may be coupled to the central processing subsystem 204 and the graphics processing subsystem 206 via power cabling, board traces, and/or any other power couplings that would be apparent to one of skill in the art in possession of the present disclosure.

In an embodiment, the chassis 202 may house a memory system (not illustrated, but which may include the memory 114 discussed above with reference to FIG. 1) that is coupled to the processing system and that includes instructions that, when executed by the processing system, cause the processing system to provide one or more workloads 210 that are configured to perform the functionality of the workloads and/or computing devices discussed below. For example, the central processing subsystem 204 and/or graphics processing subsystem 206 may be configured to execute workload instructions on the memory system to cause the central processing subsystem 204 and/or graphics processing subsystem 206 to provide the workload(s) 210, although one of skill in the art in possession of the present disclosure will appreciate that workload provisioning via other workload provisioning techniques will fall within the scope of the present disclosure as well. In some specific examples described below, the workload(s) 210 include gaming applications, but one of skill in the art in possession of the present disclosure will appreciate how the workload(s) 210 may include processing system testing applications, graphics design applications (e.g., solid modeling applications such as Computer-Aided Design (CAD) applications), and/or any other workloads that would be apparent to one of skill in the art in possession of the present disclosure.

Furthermore, the memory system housed in the chassis 202 may include instructions that, when executed by the processing system, cause the processing system to provide a processing system concurrency optimization engine 212 that is configured to perform the functionality of the processing system concurrency optimization engines and/or computing devices discussed below. For example, the central processing subsystem 204 may be configured to execute processing system concurrency optimization engine instructions on the memory system to cause the central processing subsystem 204 to provide the processing system concurrency optimization engine 212, although one of skill in the art in possession of the present disclosure will appreciate that engine provisioning via other engine provisioning techniques will fall within the scope of the present disclosure as well.

The chassis 202 may also house a storage system (not illustrated, but which may include the storage 108 discussed above with reference to FIG. 1) that is coupled to the processing system concurrency optimization engine 212 (e.g., via a coupling between the storage system and the processing system/central processing subsystem 204) and that includes a processing system concurrency optimization database 214 that is configured to store any of the information utilized by the processing system concurrency optimization engine 212 discussed below. The chassis 202 may also house or be coupled to a display system 218. For example, when the computing device 200 is provided by a laptop/notebook computing device, the display system 218 may be provided in a display chassis portion that is moveably coupled to a chassis base portion that houses most of the components illustrated in FIG. 2. However, in examples in which the computing device 200 is provided by a desktop computing device, the display system 218 may be provided in a separate display chassis that is coupled to the chassis 202 that houses most of the components illustrated in FIG. 2.

The chassis 202 may also house a communication system 216 that is coupled to the processing system concurrency optimization engine 212 (e.g., via a coupling between the communication system 216 and the processing system/central processing subsystem 204) and that may be provided by a Network Interface Controller (NIC), wireless communication systems (e.g., BLUETOOTH®, Near Field Communication (NFC) components, WiFi components, cellular communication components, etc.), and/or any other communication components that would be apparent to one of skill in the art in possession of the present disclosure. However, while a specific computing device 200 has been illustrated and described, one of skill in the art in possession of the present disclosure will recognize that computing devices (or other devices operating according to the teachings of the present disclosure in a manner similar to that described below for the computing device 200) may include a variety of components and/or component configurations for providing conventional computing device functionality, as well as the functionality discussed below, while remaining within the scope of the present disclosure as well.

Figure 3:
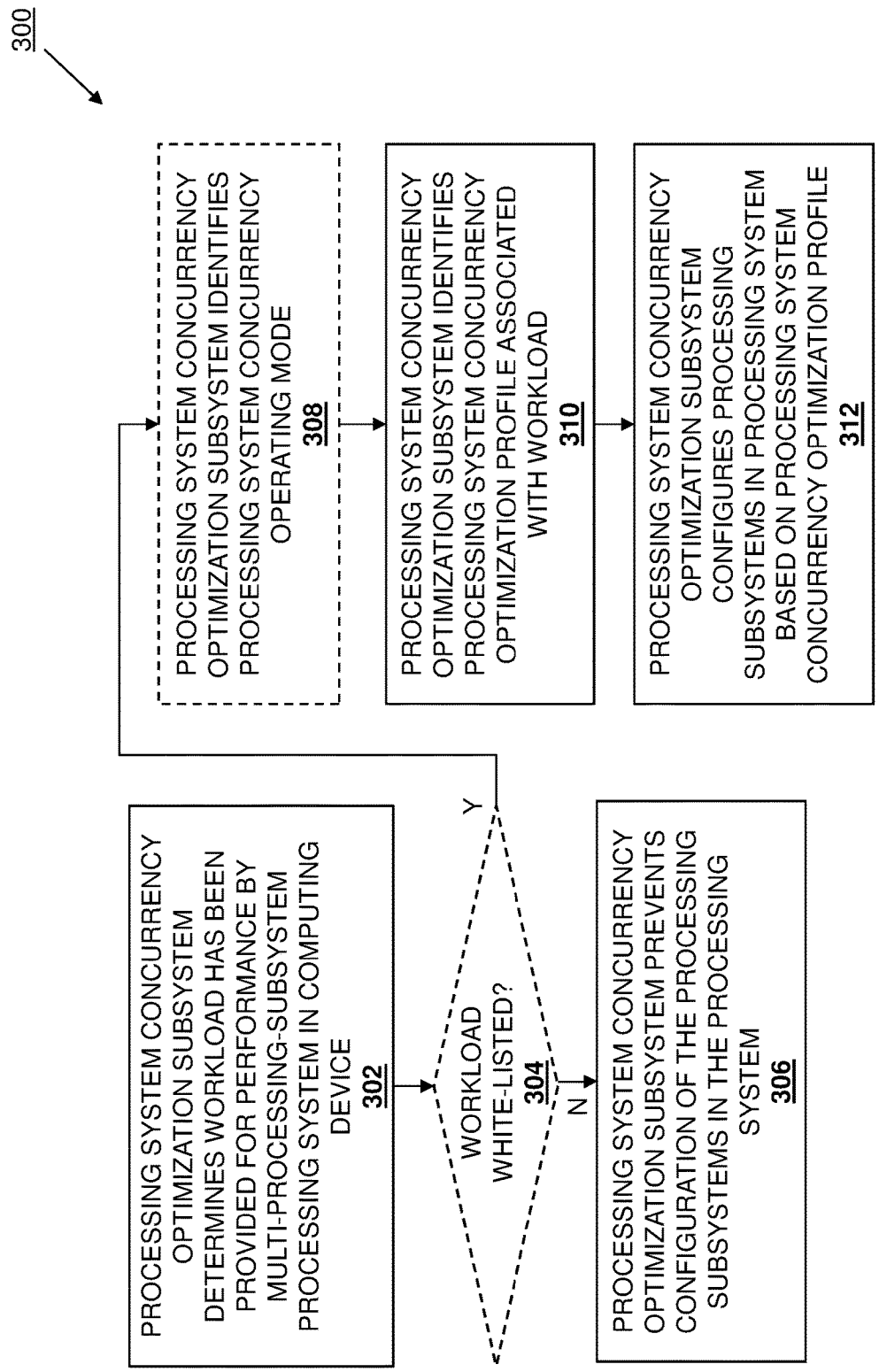
FIG. 3 is a flow chart illustrating an embodiment of a method for optimizing processing system concurrency.

Referring now to FIG. 3, an embodiment of a method 300 for optimizing processing system concurrency is illustrated. As discussed below, the systems and methods of the present disclosure provide for the optimization of the concurrent operation of processing subsystems in a processing system based on a workload that is being (or will be) performed by the processing system. For example, the processing system concurrency optimization system of the present disclosure may include a processing system having a first processing subsystem and a second processing subsystem, a power system that is coupled to the first processing subsystem and the second processing subsystem, a processing system concurrency optimization database, and a processing system concurrency optimization subsystem that is coupled to the power system and the processing system concurrency optimization database. The processing system concurrency optimization subsystem determines that a first workload has been provided for performance by the processing system, and identifies a first processing system concurrency optimization profile that is associated with the first workload in the processing system concurrency optimization database. Based on the first processing system concurrency optimization profile, the processing system concurrency optimization subsystem configures the power system to provide first power in a first power range to the first processing subsystem and second power to a second power range to the second processing subsystem. As such, the processing subsystems in the processing system may be configured differently (e.g., configured to operate using power in different power ranges discussed above, configured to operate with different processing subsystem settings, etc.) in a manner that optimizes their performance of the workload.

The method 300 begins at block 302 where a processing system concurrency optimization subsystem determines a workload has been provided for performance by a multi-processing-subsystem processing system in a computing device. In an embodiment, at block 302, one of the workload(s) 210 may be launched, started up, and/or otherwise initialized (e.g., by selecting an application icon displayed on the display system 218) and, in response, the processing system concurrency optimization engine 212 in the computing device 200 may determine that workload has been provided for performance by the processing system in the chassis 202 that includes the central processing subsystem 204 and the graphics processing subsystem 206. However, while the determination that the workload has been provided for performance by the central processing subsystem 204 and the graphics processing subsystem 206 is described above as occurring in response to a launch, start up, and/or other initialization of that workload at block 302, one of skill in the art in possession of the present disclosure will appreciate that the determination that the workload has been provided for performance by the central processing subsystem 204 and the graphics processing subsystem 206 at block 302 may occur prior to the launch, start up, and/or other initialization of that workload. For example, the processor system concurrency optimization operations discussed below may be performed in response to the installation of the workload on the computing device 200 and prior to its use, immediately prior to a regular, scheduled, or other recognized reoccurring performance of the workload, and/or any other timing prior to launch, start up, and/or other initialization of that workload that would be apparent to one of skill in the art in possession of the present disclosure.

Furthermore, while the determination that the workload has been provided for performance by the central processing subsystem 204 and the graphics processing subsystem 206 is described above as occurring prior to or in response to a launch, start up, and/or other initialization of that workload at block 302, one of skill in the art in possession of the present disclosure will appreciate that the determination that the workload has been provided for performance by the central processing subsystem 204 and the graphics processing subsystem 206 at block 302 may occur subsequent to the launch, start up, and/or other initialization of that workload. For example, the processor system concurrency optimization operations discussed below may be performed following the launch, start up, and/or other initialization of that workload and during a performance of that workload, subsequent to a performance of that workload (e.g., after the workload has been stopped, shut down, and/or otherwise suspended), and/or any other timing subsequent to launch, start up, and/or other initialization of that workload that would be apparent to one of skill in the art in possession of the present disclosure.

The method 300 may then proceed to optional decision block 304 where it may be determined whether the workload is white-listed. In an embodiment, at optional decision block 304, the processing system concurrency optimization engine 212 in the computing device 200 may operate to determine whether the workload that was provided for performance by the processing system in the computing device 200 at block 302 is a "white-listed" workload. In some examples, one or more workloads (e.g., one or more applications) may be "white-listed" such that, for those workloads, the processing system concurrency optimization engine 212 is authorized to configure the central processing subsystem 204 and the graphics processing subsystem 206 based on a processing system concurrency optimization profile, discussed in further detail below. As will be appreciated by one of skill in the art in possession of the present disclosure, a workload that is not "white-listed" may still be performed, but will not allow the configuration of the central processing subsystem 204 and the graphics processing subsystem 206 based on a processing system concurrency optimization profile.

For example, workloads such as photo editing applications, CAD applications, virtual reality applications, augmented reality applications, gaming applications, and/or any other workloads/applications that one of skill in the art in possession of the present disclosure will recognize as benefitting from the particular processing subsystem configurations discussed below may have been previously identified in a "white-list" (e.g., in the processing system concurrency optimization database 214, via a database connected to the communication system 216 through a network, etc.), and at optional block 304 the processing system concurrency optimization engine 212 in the computing device 200 may operate to determine whether the workload that was provided for performance by the processing system in the computing device 200 at block 302 is included on that "white-list". However, while optional embodiments are described in which the central processing subsystem 204 and the graphics processing subsystem 206 may only be configured based on a processing system concurrency optimization profile for "white-listed" workloads, one of skill in the art in possession of the present disclosure will appreciate that optional decision block 304 may be skipped such that the central processing subsystem 204 and the graphics processing subsystem 206 are configured based on a processing system concurrency optimization profile for any workload provided for performance by the processing system.

If, at optional decision block 304, it is determined that the workload is not whitelisted, the method 300 proceeds to block 306 where the processing system concurrency optimization subsystem prevents configuration of the processing subsystems in the processing system. As discussed below, the method 300 may operate to configure/reconfigure the central processing subsystem 204 and the graphics processing subsystem 206 based on a processing system concurrency optimization profile that is associated with the workload that was provided for performance by the processing system in the computing device 200, and in embodiments in which optional decision block 304 is performed and the workload that was provided for performance by the processing system in the computing device 200 is not "white-listed", at block 306 the processing system concurrency optimization engine 212 in the computing device 200 may prevent any configuration/reconfiguration of the central processing subsystem 204 and the graphics processing subsystem 206 for that workload. As such, at block 306, the workload that was provided for performance by the processing system in the computing device 200 at block 302 may be performed by the central processing subsystem 204 and/or the graphics processing subsystem 206 based on a current processing system concurrency operating mode of the computing device 200, discussed in further detail below.

If, at optional decision block 304, it is determined that the workload is whitelisted, or following block 302 in embodiments in which optional block 304 is omitted, the method 300 may proceed to optional block 308 where the processing system concurrency optimization subsystem identifies a processing system concurrency operating mode. In an embodiment, at optional block 308, the processing system concurrency optimization engine 212 in the computing device 200 may determine a processing system concurrency operating mode of the computing device 200. For example, the computing device 200 may be configurable in a plurality of different processing system concurrency operating modes that each configure the central processing subsystem 204 and the graphics processing subsystem 206 differently in order to provide for different concurrent operations of the central processing subsystem 204 and the graphics processing subsystem 206.

Figure 4A:
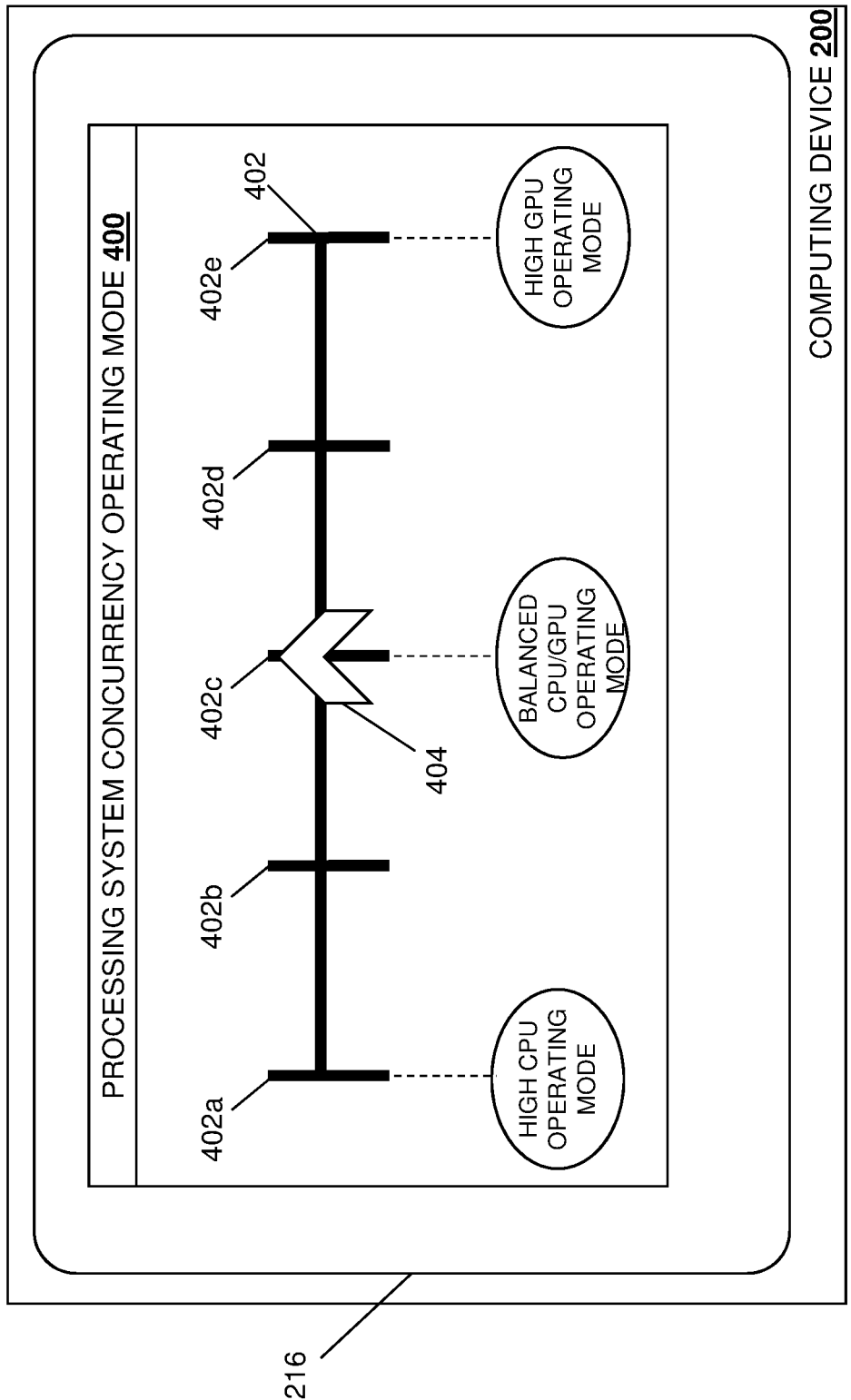
FIG. 4A is a schematic view illustrating an embodiment of a processing system concurrency operating mode Graphical User Interface (GUI) that may be provided by the computing device of FIG. 2 during the method of FIG. 3.
Figure 4B:
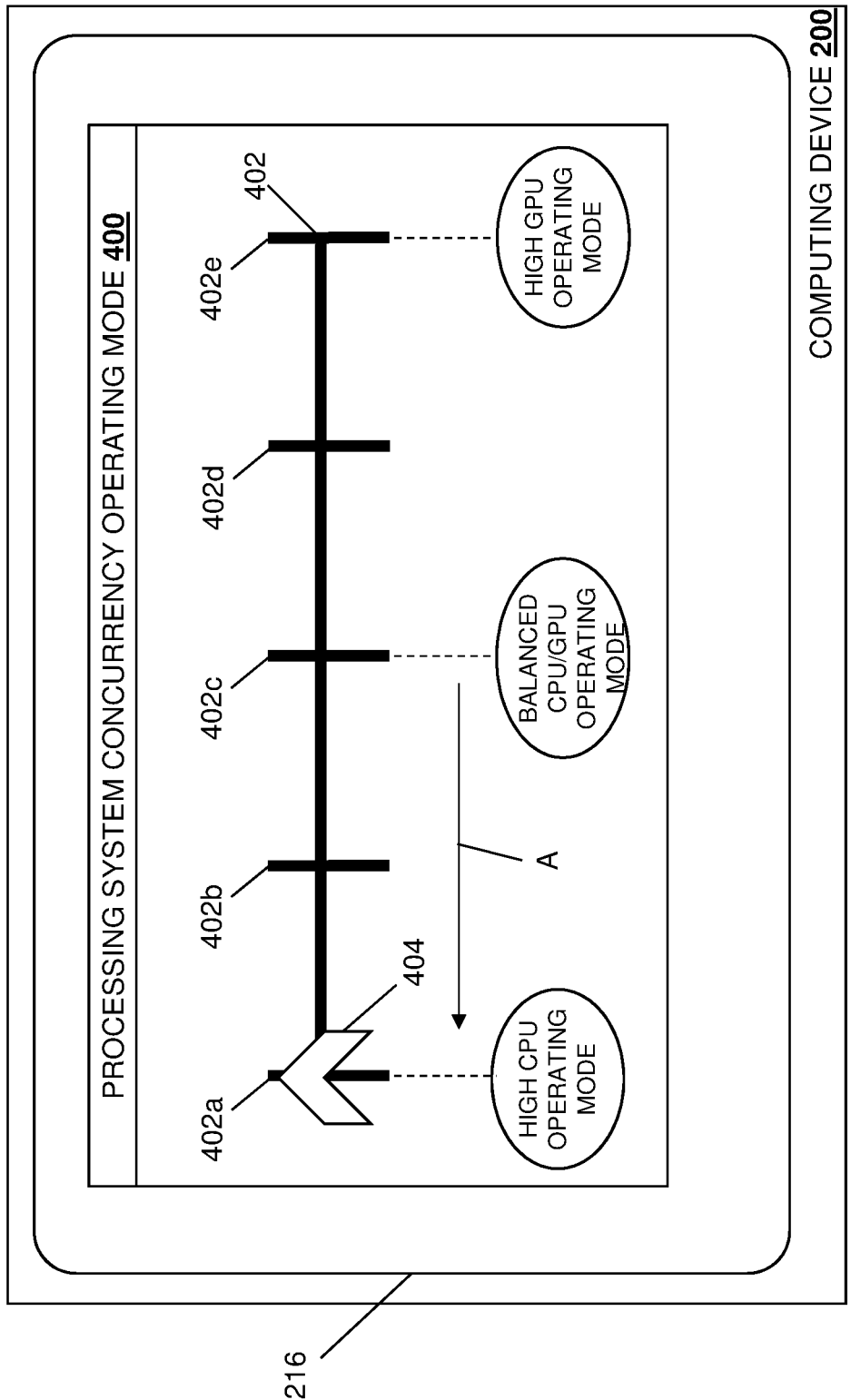
FIG. 4B is a schematic view illustrating an embodiment of a processing system concurrency operating mode GUI that may be provided by the computing device of FIG. 2 during the method of FIG. 3.
Figure 4C:
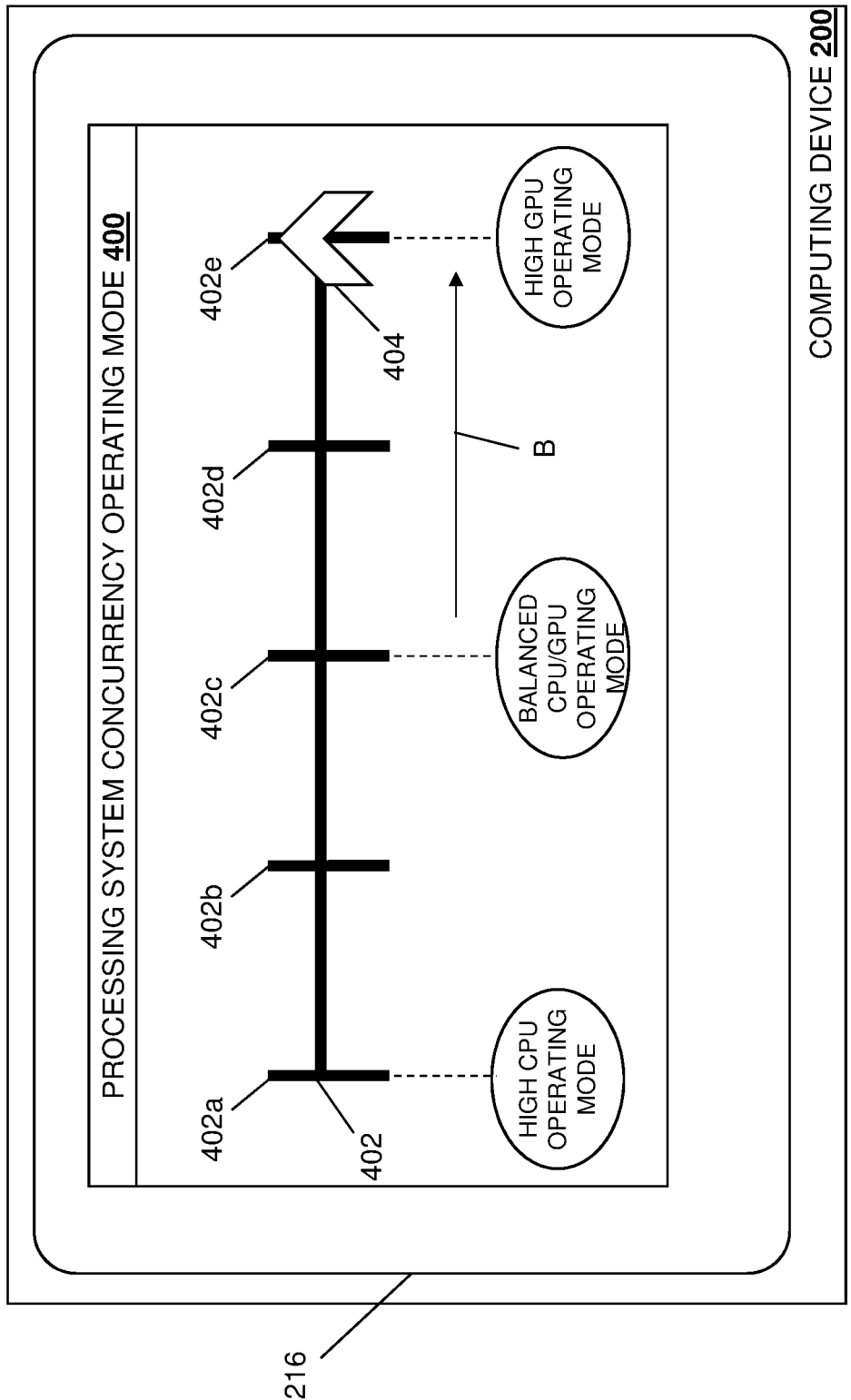
FIG. 4C is a schematic view illustrating an embodiment of a processing system concurrency operating mode GUI that may be provided by the computing device of FIG. 2 during the method of FIG. 3.

As illustrated in FIGS. 4A, 4B, and 4C, in specific examples, the display system 216 on the computing device 200 may display a processing system concurrency operating mode Graphical User Interface (GUI) 400 that allows the user of the computing device 200 to select different processing system concurrency operating modes that each configure the central processing subsystem 204 and the graphics processing subsystem 206 differently in order to provide for different concurrent operations of the central processing subsystem 204 and the graphics processing subsystem 206. In the illustrated example, the processing system concurrency operating mode GUI 400 includes a slider element 402 defining a first processing system concurrency operating mode 402a that provides a "high CPU operating mode" that predominantly utilizes CPU(s) in the central processing subsystem 204 to perform workloads, a second processing system concurrency operating mode 402b that provides a "CPU operating mode" that utilizes CPU(s) in the central processing subsystem 204 more heavily than GPU(s) in the graphics processing subsystem 206 to perform workloads, a third processing system concurrency operating mode 402c that provides a "balanced operating mode" that utilizes CPU(s) in the central processing subsystem 204 and GPU(s) in the graphics processing subsystem 206 substantially equally to perform workloads, a fourth processing system concurrency operating mode 402d that provides a "GPU operating mode" that utilizes GPU(s) in the graphics processing subsystem 206 more heavily than CPU(s) in the central processing subsystem 204 to perform workloads, and a fifth processing system concurrency operating mode 402e that provides a "high GPU operating mode" that predominantly utilizes GPU(s) in the graphics processing subsystem 206 to perform workloads.

In the illustrated example, the processing system concurrency operating mode GUI 400 also includes a selector element 404 that may be utilized by the user of the computing device 200 (e.g., via an input device included on the computing device 200 (not illustrated, but which may include the input device 106 discussed above with reference to FIG. 1)) to change the processing system concurrency operating mode of the computing device 200. As illustrated in FIG. 4A, in a specific example, the processing system concurrency operating mode of the computing device 200 may default to the third processing system concurrency operating mode 402*c* discussed above that provides a "balanced operating mode" that utilizes CPU(s) in the central processing subsystem 204 and GPU(s) in the graphics processing subsystem 206 substantially equally to perform workloads, with the selector element 404 indicating a selection of the third processing system concurrency operating mode 402*c*/"balanced operating mode".

The inventors of the present disclosure have found that providing such a "balanced operating mode" as the default processing system concurrency operating mode for the computing device 200 provides particular benefits related to how some users characterize and publicize computing device performance. For example, for many relatively high-performance gaming laptop/notebook computing devices, users will often perform processing system testing on those computing devices immediately after purchasing them, and the processing system testing workloads/applications utilized in that processing system testing typically report the highest performance/best results when the processing system concurrency operating mode of the computing device 200 is provided as the "balanced operating mode".

As illustrated in FIG. 4B, in a specific example, a user of the computing device 200 may change the processing system concurrency operating mode of the computing device 200 by moving the selector element 404 in a direction A from the default/third processing system concurrency operating mode 402*c* to the first processing system concurrency operating mode 402*a* discussed above that provides a "high CPU operating mode" that predominantly utilizes CPU(s) in the central processing subsystem 204 to perform workloads, with the selector element 404 indicating a selection of the first processing system concurrency operating mode 402*a*/"high CPU operating mode". As will be appreciated by one of skill in the art in possession of the present disclosure, the user may select the first processing system concurrency operating mode 402*a*/"high CPU operating mode" when they plan on utilizing the computing device 200 to perform relatively-CPU-intensive workloads/applications such as, for example, simulation processing workloads (e.g., via CAD applications), video editing workloads, and/or other relatively-CPU-intensive workloads/applications that would be apparent to one of skill in the art in possession of the present disclosure. While not illustrated or described below, one of skill in the art in possession of the present disclosure will appreciate how the user of the computing device 200 may perform similar operations to change the processing system concurrency operating mode of the computing device 200 to the second processing system concurrency operating mode 402*b* discussed above that provides a "CPU operating mode" that utilizes CPU(s) in the central processing subsystem 204 more heavily than GPU(s) in the graphics processing subsystem 206 to perform workloads.

As illustrated in FIG. 4C, in another specific example, a user of the computing device 200 may change the processing system concurrency operating mode of the computing device 200 by moving the selector element 404 in a direction B from the default/third processing system concurrency operating mode 402*c* to the fifth processing system concurrency operating mode 402*e* discussed above that provides a "high GPU operating mode" that predominantly utilizes GPU(s) in the graphics processing subsystem 20*b* to perform workloads, with the selector element 404 indicating a selection of the fifth processing system concurrency operating mode 402*e*/"high GPU operating mode". As will be appreciated by one of skill in the art in possession of the present disclosure, the user may select the fifth processing system concurrency operating mode 402*e*/"high GPU operating mode" when they plan on utilizing the computing device 200 to perform relatively-GPU-intensive workloads/applications such as, for example, gaming workloads, cryptocurrency mining workloads, and/or other relatively-GPU-intensive workloads/applications that would be apparent to one of skill in the art in possession of the present disclosure While not illustrated or described below, one of skill in the art in possession of the present disclosure will appreciate how the user of the computing device 200 may perform similar operations to change the processing system concurrency operating mode of the computing device 200 to the fourth processing system concurrency operating mode 402D discussed above that provides a "GPU operating mode" that utilizes GPU(s) in the graphics processing subsystem 206 more heavily than CPU(s) in the central processing subsystem 204 to perform workloads.

With reference to FIG. 5, an embodiment of a processing system concurrency optimization database 500 is illustrated that may provide the processing system concurrency optimization database 214 discussed above with reference to FIG. 2, and that illustrates how different configuration settings may be provided for the central processing subsystem 204 and the graphics processing subsystem 206 for each of the processing system concurrency operating modes 402*a*, 402*b*, 402*c*, 402*d*, and 402*e* discussed above. For example, the processing system concurrency optimization database 500 includes a first table 502 for the central processing subsystem 204 that includes rows for maximum clock speed/overclocking settings for each of the processing system concurrency operating modes 402*a*-402*e*, average power settings for each of the processing system concurrency operating modes 402*a*-402*e*, peak power settings for each of the processing system concurrency operating modes 402*a*-402*e*, temperature ceiling settings for each of the processing system concurrency operating modes 402*a*-402*e*, and Operating System (OS) bias: Energy Performance Preference (EPP)/Processor Power Management (PPM) settings for each of the processing system concurrency operating modes 402*a*-402*e*. Similarly, the processing system concurrency optimization database 500 includes a second table 504 for the graphics processing subsystem 206 that includes rows for maximum clock speed/overclocking settings for each of the processing system concurrency operating modes 402*a*-402*e*, average power settings for each of the processing system concurrency operating modes 402*a*-402*e*, peak power settings for each of the processing system concurrency operating modes 402*a*-402*e*, and temperature ceiling settings for each of the processing system concurrency operating modes 402*a*-402*e*.

As such, in the specific example illustrated in FIG. 5, the first processing system concurrency operating mode 402*a*/"high CPU operating mode" configures the central processing subsystem 204 to operate at 110% maximum clock speed/overclocking, 120% average power, 120% peak power, 100% temperature ceiling, and 100% OS bias: EPP/PPM, and configures the graphics processing subsystem 206 to operate at 90% maximum clock speed/overclocking, 80% average power, 80% peak power, and 90% temperature ceiling. Similarly, the second processing system concurrency operating mode 402*b*/"CPU operating mode" configures the central processing subsystem 204 to operate at 105% maximum clock speed/overclocking, 110% average power, 110% peak power, 100% temperature ceiling, and 90% OS bias: EPP/PPM, and configures the graphics processing subsystem 206 to operate at 95% maximum clock speed/overclocking, 90% average power, 90% peak power, and 95% temperature ceiling. Similarly, the third processing system concurrency operating mode 402c/"balanced operating mode" configures the central processing subsystem 204 to operate at 100% maximum clock speed/overclocking, 100% average power, 100% peak power, 100% temperature ceiling, and 80% OS bias: EPP/PPM, and configures the graphics processing subsystem 206 to operate at 100% maximum clock speed/overclocking, 100% average power, 80% peak power, and 100% temperature ceiling.

Similarly, the fourth processing system concurrency operating mode 402d/"GPU operating mode" configures the central processing subsystem 204 to operate at 95% maximum clock speed/overclocking, 90% average power, 90% peak power, 95% temperature ceiling, and 70% OS bias: EPP/PPM, and configures the graphics processing subsystem 206 to operate at 105% maximum clock speed/overclocking, 110% average power, 110% peak power, and 100% temperature ceiling. Similarly, the fifth processing system concurrency operating mode 402e/"high GPU operating mode" configures the central processing subsystem 204 to operate at 90% maximum clock speed/overclocking, 80% average power, 80% peak power, 90% temperature ceiling, and 60% OS bias: EPP/PPM, and configures the graphics processing subsystem 206 to operate at 110% maximum clock speed/overclocking, 120% average power, 120% peak power, and 100% temperature ceiling. However, while several specific examples of processing subsystem settings have been provided for a central processing subsystem and a graphics processing subsystem according to particular processing system concurrency operating modes, one of skill in the art in possession of the present disclosure will appreciate how a variety of different processing subsystem settings may be defined for any particular processing system concurrency operating mode while remaining within the scope of the present disclosure as well.

Thus, in the example provided in FIG. 5 and as discussed below, the processing system concurrency operating modes 402a-402e define different power configuration values that may be utilized to configure the power system 208 to provide first power in a first power range to the central processing subsystem 204 and second power in a second power range to the graphics processing subsystem 206. For example, one of skill in the art in possession of the present disclosure will appreciate how the average power and peak power settings defined for the central processing subsystem 204 and the graphic processing subsystem 206 for each of the processing system concurrency operating modes 402a-402e may be utilized to configure the central processing subsystem 204, the graphics processing subsystem 206, and the power system 208 such that the central processing subsystem 204 utilizes power in a power range defined by its corresponding average power and peak power settings, and the graphics processing subsystem 206 utilizes power in a power range defined by its corresponding average power and peak power settings.

Furthermore, while a specific embodiment is described above that includes a processing system concurrency operating mode GUI that allows a user of the computing device 200 to change the processing system concurrency operating mode of the computing device 200, one of skill in the art in possession of the present disclosure will appreciate that the processing system concurrency operating mode may be configurable via a variety of other techniques that will fall within the scope of the present disclosure as well. As such, the computing device 200 may have previously been configured (e.g., by default or explicit configuration) in a particular processing system concurrency operating mode, and at optional block 308 the processing system concurrency optimization engine 212 in the computing device 200 may identify that processing system concurrency operating mode of the computing device 200. However, one of skill in the art in possession of the present disclosure will recognize that the determination of the processing system concurrency operating mode of the computing device 200 at optional block 308 may be omitted in other embodiments of the method 300.

Following block 302 (i.e., in embodiments that omit optional blocks 304 and 308), following optional decision block 304 (i.e., in embodiments that omit optional block 308), or following optional block 308 (e.g., in embodiments that may include or omit optional decision block 304), the method 300 may proceed to block 310 where the processing system concurrency optimization subsystem identifies a processing system concurrency optimization profile associated with the workload. In an embodiment, at block 310, the processing system concurrency optimization engine 212 in the computing device 200 may access the processing system concurrency optimization database 214 and identify a processing system concurrency optimization profile that is associated with the workload that was determined to have been provided for performance by the processing system in the computing device 200 at block 302.

In some examples, the processing system concurrency optimization database 214 may store a workload/processing system concurrency optimization profile table that associates different workloads with respective processing system concurrency optimization profiles that were previously defined with processing subsystem settings that provide for the optimized performance of those workloads. For example, a manufacturer of the computing device 200 and/or a provider of the processing system concurrency optimization system may characterize the performance of a computing device platform that includes the computing device 200 when providing a variety of different photo editing applications, CAD applications, virtual reality applications, augmented reality applications, gaming applications, and/or any other workload/applications are performed by that computing device platform, and one of skill in the art in possession of the present disclosure will appreciate how such characterization operations may result in the identification of the processing subsystem settings that optimize the performance of each of those applications by that computing device platform. As such, the processing system concurrency optimization database 214 may be provided with the workload/processing system concurrency optimization profile table discussed above that associate's different workloads/applications with respective processing system concurrency optimization profiles (including processing subsystem settings) that result from those characterization operations.

In some examples, the processing system concurrency optimization profiles may be associated with workloads based on the teachings of U.S. patent application Ser. No. 17/243,777, filed on Apr. 29, 2021, which was invented by the inventors of the present application and the disclosure of which is incorporated by reference herein in its entirety. As described in that application, computing device/workload performance profiles (or computing device/application performance profiles) may be generated based on second computing device settings that are reported by second computing devices and that are utilized by those second computing devices while they perform a workload, and based on second computing device performance information that is reported by the second computing devices and that is generated by second computing devices while providing the workload. As will be appreciated by one of skill in the art in possession of the present disclosure, the computing device/workload performance profiles described in that application may include the processing system concurrency optimization profiles of the present disclosure, and may be utilized as discussed below while remaining within the scope of the present disclosure as well.

In a specific example, the processing system concurrency optimization profile that is identified at block 310 as being associated with the workload may be one of the processing system concurrency operating modes 402a-402e discussed above. For example, the characterization operations discussed above may have included the performance of the workload by the computing device platform while that computing device platform was configured in the different processing system concurrency operating modes 402a-402e discussed above, which allows a determination of which of those processing system concurrency operating modes 402a-402e provides for the optimized performance of that workload. As such, in some examples, for any workload determined to have been provided for performance by the processing system in the computing device 200, one of the processing system concurrency operating modes 402a-402e may be associated with that workload as the processing system concurrency optimization profile discussed above.

In another specific example, the processing system concurrency optimization profile that is identified at block 310 as being associated with the workload may include particular processing subsystem settings (i.e., that differ from any combination of the processing subsystem settings included in any one of the processing system concurrency operating modes 402a-402e discussed above). For example, the characterization operations discussed above may have included a determination of the particular processing subsystem settings that provide for the best performance of the workload by the computing device platform, which allows a determination of a particular set of processing subsystem settings that are not provided by any of the processing system concurrency operating modes 402a-402e and that provide for the optimized performance of that workload. As such, in some examples, for any workload determined to have been provided for performance by the processing system in the computing device 200, a set of processing subsystem settings may be associated with that workload as the processing system concurrency optimization profile discussed above.

In another specific example, the processing system concurrency optimization profile that is identified at block 310 as being associated with the workload may include different processing subsystem settings depending on which of the processing system concurrency operating modes 402a-402e discussed above that the computing device 200 is currently operating in. For example, the characterization operations discussed above may have included a determination of the particular processing subsystem setting modifications that provide for the best performance of the workload by the computing device platform when that computing device platform is operating in each of the processing system concurrency operating modes 402a-402e discussed above, which allows a determination of particular processing subsystem setting modifications for any of the processing system concurrency operating modes 402a-402e that will provide for the optimized performance of that workload based on the processing system concurrency operating mode the computing device platform is currently operating in. As such, in some examples, for any workload determined to have been provided for performance by the processing system in the computing device 200, a set of processing subsystem setting modifications may be associated with both 1) that workload and 2) a current processing system concurrency operating mode, as the processing system concurrency optimization profile discussed above. However, while several specific processing system concurrency optimization profiles have been described, one of skill in the art in possession of the present disclosure will appreciate that a wide variety of processing system concurrency optimization profiles will fall within the scope of the present disclosure as well.

The method 300 may then proceed to block 312 where the processing system concurrency optimization subsystem configures the processing subsystems in the processing system based on the processing system concurrency optimization profile. In an embodiment, at block 312, the processing system concurrency optimization engine 212 in the computing device 200 may configure the central processing subsystem 204 and the graphics processing subsystem 206 based on the processing system concurrency optimization profile identified at block 310.

As such, continuing with the example provided above with reference to FIG. 5, at block 312 the processing system concurrency optimization engine 212 in the computing device 200 may configure the maximum clock speed/overclocking settings, the average power settings, the peak power settings, the temperature ceiling settings, and/or the OS bias: EPP/PPM settings for the central processing subsystem 204 based on the values identified in the processing system concurrency optimization profile identified at block 310. Similarly, at block 312 the processing system concurrency optimization engine 212 in the computing device 200 may configure the maximum clock speed/overclocking settings, the average power settings, the peak power settings, and/or the temperature ceiling settings for the graphics processing subsystem 206 based on the values identified in the processing system concurrency optimization profile identified at block 310.

Continuing with the example above in which the processing system concurrency optimization profile is one of the processing system concurrency operating modes 402a-402e, at block 312 the processing system concurrency optimization engine 212 in the computing device 200 may configure the maximum clock speed/overclocking settings, the average power settings, the peak power settings, the temperature ceiling settings, and/or the OS bias: EPP/PPM settings for the central processing subsystem 204 based on the values identified for that processing system concurrency operating mode (e.g., the values identified in the table 502 for the central processing subsystem 204 in the processing system concurrency optimization database 500 for that processing system concurrency operating mode). Similarly, at block 312 the processing system concurrency optimization engine 212 in the computing device 200 may configure the maximum clock speed/overclocking settings, the average power settings, the peak power settings, and/or the temperature ceiling settings for the graphics processing subsystem 206 based on the values identified for that processing system concurrency operating mode (e.g., the values identified in the table 504 for the graphics processing subsystem 206 in the processing system concurrency optimization database 500 for that processing system concurrency operating mode).

Continuing with the example above in which the processing system concurrency optimization profile includes particular processing subsystem settings (i.e., that differ from any combination of the processing subsystem settings included in any one of the processing system concurrency operating modes 402a-402e discussed above), at block 312 the processing system concurrency optimization engine 212 in the computing device 200 may configure the maximum clock speed/overclocking settings, the average power settings, the peak power settings, the temperature ceiling settings, and/or the OS bias: EPP/PPM settings for the central processing subsystem 204 based on the values identified for that processing system concurrency optimization profile. Similarly, at block 312 the processing system concurrency optimization engine 212 in the computing device 200 may configure the maximum clock speed/overclocking settings, the average power settings, the peak power settings, and/or the temperature ceiling settings for the graphics processing subsystem 206 based on the values identified for that processing system concurrency optimization profile.

Continuing with the example above in which the processing system concurrency optimization profile includes processing subsystem settings that depend on which of the processing system concurrency operating modes 402a-402e discussed above that the computing device 200 is currently operating in, at block 312 the processing system concurrency optimization engine 212 in the computing device 200 may configure the maximum clock speed/overclocking settings, the average power settings, the peak power settings, the temperature ceiling settings, and/or the OS bias: EPP/PPM settings for the central processing subsystem 204 based on the values identified for that processing system concurrency optimization profile for the current processing system concurrency operating mode of the computing device 200. Similarly, at block 312 the processing system concurrency optimization engine 212 in the computing device 200 may configure the maximum clock speed/overclocking settings, the average power settings, the peak power settings, and/or the temperature ceiling settings for the graphics processing subsystem 206 based on the values identified for that processing system concurrency optimization profile for the current processing system concurrency operating mode of the computing device 200. However, while the configuration of processing subsystems based on specific examples of processing system concurrency optimization profiles has been described, one of skill in the art in possession of the present disclosure will appreciate how the central processing subsystem 204 and the graphics processing subsystem 206 may be configured in a variety of manners that will provide for optimized performance of a workload/application while remaining within the scope of the present disclosure as well.

As such, continuing with the example provided in FIG. 5 above, the processing system concurrency optimization profiles define different power configuration values that may be utilized to configure the power system 208 to provide first power in a first power range to the central processing subsystem 204 and second power in a second power range to the graphics processing subsystem 206. For example, one of skill in the art in possession of the present disclosure will appreciate how the average power and peak power settings defined for the central processing subsystem 204 and the graphic processing subsystem 206 for the processing system concurrency optimization profile may be utilized to configure the central processing subsystem 204, the graphics processing subsystem 206, and the power system 208 such that the central processing subsystem 204 utilizes power in a power range defined by its corresponding average power and peak power settings, and the graphics processing subsystem 206 utilizes power in a power range defined by its corresponding average power and peak power settings.

However, while specific processing subsystem settings are discussed above, one of skill in the art in possession of the present disclosure will appreciate how a variety of processing subsystem settings may be configured at block 312 while remaining within the scope of the present disclosure as well. For example, at block 312, the central processing subsystem 204 may have central processing subsystem speed shift setting (e.g., a CPU EEP setting) configured, a central processing subsystem power management setting (e.g., a CPU PPM setting) configured, other central processing subsystem power settings configured, other central processing subsystem temperature settings configured, a central processing subsystem current setting configured, other central processing subsystem clocking settings configured, and/or any other central processing subsystem settings that would be apparent to one of skill in the art configured. Similarly, at block 312, the graphics processing subsystem 206 may have other graphics processing subsystem power settings configured, other graphics processing subsystem temperature settings configured, a graphics processing subsystem current setting configured, other graphics processing subsystem clocking settings configured, and/or any other graphics processing subsystem settings that would be apparent to one of skill in the art configured.

With reference to FIGS. 6A and 6B, another specific example of a processing system concurrency optimization database 600 is illustrated that may provide the processing system concurrency optimization database 214 discussed above with reference to FIG. 2, and that illustrates further examples of different configuration settings may be provided for the central processing subsystem 204 and the graphics processing subsystem 206 for each of a plurality of different processing system concurrency operating modes 602a, 602b, 602c, 602d, and 602e discussed above. In this example, the processing system concurrency operating mode 602a provides a "performance mode" that favors use of the graphics processing subsystem 206 over the central processing subsystem 204 when performing workloads, the processing system concurrency operating mode 602b provides a "balanced mode" that provides for substantially equal use of the graphics processing subsystem 206 and the central processing subsystem 204 when performing workloads, the processing system concurrency operating mode 602c provides a "low power mode" that favors a relatively low thermal response by the components in the computing device 200 when performing workloads, the processing system concurrency operating mode 602d provides a "quiet mode" that favors a relatively low acoustical response (e.g., low component noise) when performing workloads (e.g., as the expense of performance), and the processing system concurrency operating mode 602e provides a "full-speed mode" that may allow the graphics processing subsystem 206 and the central processing subsystem 204 to operate up to their maximum capabilities when performing workloads (but at the expense of relatively high acoustical response (e.g., high component noise due to full speed fan operation)).

In the example provided in FIGS. 6A and 6B, the processing system concurrency optimization database 600 includes a table 604 that defines the different settings for the computing device 200 that may be configured in each of the processing system concurrency operating modes 602a-602e, and while specific values are not provided in the table 604 illustrated in FIGS. 6A and 6B (other than to indicate an embodiment in which certain settings are not applicable for particular processing system concurrency operating modes), one of skill in the art in possession of the present disclosure will recognize how different setting values may be determined for each of the performance mode, balanced mode, low power mode, quiet mode, and full-speed mode in order to accomplish the particular mode functionalities described above.

In the illustrated example, the table 604 includes a targets section 604a that includes, for each of the processing system concurrency operating modes 602a-602e, acoustic limit settings that may define an acoustic budget for the computing device (e.g., a maximum or desired noise (e.g., measured in sones or decibel level) for computing device 200 during its operation), maximum surface temperature settings that may define maximum temperature for the outer surface of the chassis 202 of the computing device 200, and minimum CPU power settings that may define the minimum power that will be supplied to the central processing subsystem 204 while the graphics processing subsystem 206 is being utilized.

In the illustrated example, the table 604 also includes a Dynamic Tuning Technology (DTT) settings section 604b that includes, for each of the processing system concurrency operating modes 602a-602e, CPU/GPU priority settings that may define which of the central processing subsystem 204 and the graphics processing subsystem 206 are being favored in an operating mode, CPU target power settings that may define a target power setting for the central processing subsystem 204 (e.g., the power to the central processing subsystem 204 may be lowered to the defined setting when the graphics processing subsystem 206 is relatively heavily utilized), GPU throttle temperature settings that may define a control point based on the temperature of the graphics processing subsystem 206 and at which the operation of the central processing subsystem 204 may be throttled, and GPU VR throttle temperature settings that may define a control point based on the temperature of a voltage regulator for the graphics processing subsystem 206 and at which the operation of the central processing subsystem 204 may be throttled. While not illustrated in the table 604 in FIGS. 6A and 6B, the computing device 200 may allow for the setting of total graphics power to the graphics processing subsystem 206 (and/or related graphics components) in the different processing system concurrency operating modes 602a-602e.

In the illustrated example, the table 604 also includes a boost settings section 604c that includes, for each of the processing system concurrency operating modes 602a-602e, boost availability settings that may define the amount of additional power that may be provided to the graphics processing subsystem 206 above its Total Graphics Power (TGP) assuming the central processing subsystem 204 is using less than proportional share of a defined power amount (e.g., if the central processing subsystem 204 is using 25 watts and the defined power amount is 45 watts, the boost available may be (45 watts−30 watts=) 15 watts for the graphics processing subsystem 206), and total platform power settings that may define tuning information for boost operations.

In the illustrated example, the table 604 also includes a quiet mode settings section 604d that includes, for the processing system concurrency operating modes 602c and 602d (and that are not applicable to the processing system concurrency operating modes 602a, 602b, and 602e as illustrated in FIG. 6B), enable/disable settings that may define whether quiet mode is enabled (e.g., quiet mode is only enabled for the processing system concurrency operating modes 602c and 602d in the illustrated embodiment), acoustic limit settings that may define the acoustic limits that may cap the acoustic budget for the computing device 200, CPU power force point settings that may define a forced power that is provided to the central processing subsystem 204 in the processing system concurrency operating modes 602c and 602d, and frames per second settings that may define a target frames per second provided in the processing system concurrency operating modes 602c and 602d. In the illustrated example, the table 604 also includes a speed shift settings section 604e that includes, for the processing system concurrency operating modes 602a-602e, CPU preference settings that may define the preference for using the central processing system 204 (e.g., which may provide for balanced use of the central processing system 204, a preferred use of the central processing system 204 that provides the best battery life, a preferred use of the central processing system 204 that provides the best performance, etc.).

Thus, systems and methods have been described that provide for the optimization of the concurrent operation of a CPU and a GPU in a laptop/notebook or desktop computing device based on an application that is being (or will be) performed by that computing device. For example, the processing system concurrency optimization system of the present disclosure may include CPU and a GPU, a power system that is coupled to the CPU and the GPU, a processing system concurrency optimization database, and a processing system concurrency optimization subsystem that is coupled to the power system and the processing system concurrency optimization database. The processing system concurrency optimization subsystem determines that a first application has been provided for performance by the computing device, and identifies a first processing system concurrency optimization profile that is associated with the first application in the processing system concurrency optimization database. Based on the first processing system concurrency optimization profile, the processing system concurrency optimization subsystem configures the power system to provide first power in a first power range to the CPU and second power to a second power range to the GPU. As such, the CPU and the GPU may be configured differently (e.g., configured to operate using power in different power ranges discussed above, configured to operate with different CPU/GPU settings, etc.) in a manner that optimizes the performance of the application.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A processing system concurrency optimization system, comprising:
   a processing system including:
      a first processing subsystem; and
      a second processing subsystem;
   a power system that is coupled to the first processing subsystem and the second processing subsystem;
   a processing system concurrency optimization database; and
   a processing system concurrency optimization subsystem that is coupled to the power system and the processing system concurrency optimization database, wherein the processing system concurrency optimization subsystem is configured to:

determine that a first workload has been provided for performance by the processing system;

identify a first processing system concurrency optimization profile that is associated with the first workload in the processing system concurrency optimization database; and configure, based on the first processing system concurrency optimization profile, the power system to provide first power to the first processing subsystem in a first power range that is defined by a first processing subsystem average power setting and a first processing subsystem peak power setting of the first processing subsystem, and provide second power to the second processing subsystem in a second power range that is defined by a second processing subsystem average power setting and a second processing subsystem peak power setting of the second processing subsystem.

2. The system of claim 1, wherein the first processing subsystem includes a central processing subsystem having at least one Central Processing Unit (CPU), and wherein the second processing subsystem includes a graphics processing subsystem having at least one Graphics Processing Unit (GPU).

3. The system of claim 1, wherein processing system concurrency optimization subsystem is configured to:

determine, in response to determining that the first workload has been provided for performance by the processing system, that the first workload includes a whitelisted workload that is included in a previously-identified whitelist that authorizes the configuration of the power system based on the first processing system concurrency optimization profile.

4. The system of claim 1, wherein processing system concurrency optimization subsystem is configured to:

identify, in response to determining that the first workload has been provided for performance by the processing system, a processing system concurrency operating mode of the processing system, wherein the first processing system concurrency optimization profile is identified based on the processing system concurrency operating mode.

5. The system of claim 4, wherein processing system concurrency optimization subsystem is configured to:

provide, for display that is coupled to the processing system concurrency optimization subsystem, a processing system concurrency operating mode Graphical User Interface (GUI); and receive, via an input device that is coupled to the processing system concurrency optimization subsystem and through the processing system concurrency operating mode GUI, a selection of the processing system concurrency operating mode for the processing system.

6. The system of claim 1, wherein processing system concurrency optimization subsystem is configured to:

configure, based on the first processing system concurrency optimization profile, at least one first processing subsystem setting for the first processing subsystem; and configure, based on the first processing system concurrency optimization profile, at least one second processing subsystem setting for the second processing subsystem.

7. An Information Handling System (IHS), comprising:

a processing system including:
a first processing subsystem; and
a second processing subsystem; and a memory system that is coupled to the processing system and that includes instructions that, when executed by the processing system, cause the processing system to provide a processing system concurrency optimization engine that is configured to:

determine that a first workload has been provided for performance by the processing system;

identify a first processing system concurrency optimization profile that is associated with the first workload in a processing system concurrency optimization database; and configure, based on the first processing system concurrency optimization profile, a power system to provide first power to the first processing subsystem in a first power range that is defined by a first processing subsystem average power setting and a first processing subsystem peak power setting of the first processing subsystem, and provide second power to the second processing subsystem in a second power range that is defined by a second processing subsystem average power setting and a second processing subsystem peak power setting of the second processing system.

8. The IHS of claim 7, wherein the first processing subsystem includes a central processing subsystem having at least one Central Processing Unit (CPU), and wherein the second processing subsystem includes a graphics processing subsystem having at least one Graphics Processing Unit (GPU).

9. The IHS of claim 7, wherein processing system concurrency optimization engine is configured to:

determine, in response to determining that the first workload has been provided for performance by the processing system, that the first workload includes a whitelisted workload that is included in a previously-identified whitelist that is authorized to be performed by the processing system.

10. The IHS of claim 7, wherein processing system concurrency optimization engine is configured to:

identify, in response to determining that the first workload has been provided for performance by the processing system, a processing system concurrency operating mode of the processing system, wherein the first processing system concurrency optimization profile is identified based on the processing system concurrency operating mode.

11. The IHS of claim 10, wherein processing system concurrency optimization engine is configured to:

provide, for display that is coupled to the processing system concurrency optimization engine, a processing system concurrency operating mode Graphical User Interface (GUI); and receive, via an input device that is coupled to the processing system concurrency optimization engine and through the processing system concurrency operating mode GUI, a selection of the processing system concurrency operating mode for the processing system.

12. The IHS of claim 7, wherein processing system concurrency optimization engine is configured to:

configure, based on the first processing system concurrency optimization profile, at least one first processing subsystem setting for the first processing subsystem; and configure, based on the first processing system concurrency optimization profile, at least one second processing subsystem setting for the second processing subsystem.

13. The IHS of claim 12, wherein the at least one first processing subsystem setting includes one or more of a first processing subsystem speed shift setting, a first processing subsystem power management setting, a first processing subsystem power setting, a first processing subsystem temperature setting, a first processing subsystem current setting, or a first processing subsystem clocking setting, and
  wherein the at least one second processing subsystem setting includes one or more of a second processing subsystem power setting, a second processing subsystem temperature setting, a second processing subsystem current setting, or a second processing subsystem clocking setting.

14. A method for optimizing processing system concurrency, comprising:
  determining, by a processing system concurrency optimization subsystem, that a first workload has been provided for performance by a processing system;
  identifying, by the processing system concurrency optimization subsystem, a first processing system concurrency optimization profile that is associated with the first workload in a processing system concurrency optimization database; and
  configuring, by the processing system concurrency optimization subsystem based on the first processing system concurrency optimization profile, a power system to provide first power to a first processing subsystem that is included in the processing system in a first power range that is defined by a first processing subsystem average power setting and a first processing subsystem peak power setting of the to a first processing subsystem, and provide second power to a second processing subsystem that is included in the processing system in a second power range that is defined by a second processing subsystem average power setting and a second processing subsystem peak power setting of the second processing system.

15. The method of claim 14, wherein the first processing subsystem includes a central processing subsystem having at least one Central Processing Unit (CPU), and wherein the second processing subsystem includes a graphics processing subsystem having at least one Graphics Processing Unit (GPU).

16. The method of claim 14, further comprising:
  determining, by the processing system concurrency optimization subsystem in response to determining that the first workload has been provided for performance by the processing system, that the first workload includes a white-listed workload that is included in a previously-identified whitelist and that is authorized to be performed by the processing system.

17. The method of claim 14, further comprising:
  identifying, by the processing system concurrency optimization subsystem in response to determining that the first workload has been provided for performance by the processing system, a processing system concurrency operating mode of the processing system, wherein the first processing system concurrency optimization profile is identified based on the processing system concurrency operating mode.

18. The method of claim 17, further comprising:
  providing, by the processing system concurrency optimization subsystem for display that is coupled to the processing system concurrency optimization subsystem, a processing system concurrency operating mode Graphical User Interface (GUI); and
  receiving, by the processing system concurrency optimization subsystem via an input device that is coupled to the processing system concurrency optimization subsystem and through the processing system concurrency operating mode GUI, a selection of the processing system concurrency operating mode for the processing system.

19. The method of claim 14, further comprising:
  configuring, by the processing system concurrency optimization subsystem based on the first processing system concurrency optimization profile, at least one first processing subsystem setting for the first processing subsystem; and
  configuring, by the processing system concurrency optimization subsystem based on the first processing system concurrency optimization profile, at least one second processing subsystem setting for the second processing subsystem.

20. The method of claim 19, wherein the at least one first processing subsystem setting includes one or more of a first processing subsystem speed shift setting, a first processing subsystem power management setting, a first processing subsystem power setting, a first processing subsystem temperature setting, a first processing subsystem current setting, or a first processing subsystem clocking setting, and
  wherein the at least one second processing subsystem setting includes one or more of a second processing subsystem power setting, a second processing subsystem temperature setting, a second processing subsystem current setting, or a second processing subsystem clocking setting.

\* \* \* \* \*

UNITED STATES PATENT AND TRADEMARK OFFICE
CERTIFICATE OF CORRECTION

PATENT NO. : 11,934,286 B2
APPLICATION NO. : 17/243702
DATED : March 19, 2024
INVENTOR(S) : Vick et al.

It is certified that error appears in the above-identified patent and that said Letters Patent is hereby corrected as shown below:

In the Claims

Claim 14, Column 21, Line 31, "the to a first processing subsystem" should read --the first processing subsystem--

Signed and Sealed this
Fourth Day of June, 2024

Katherine Kelly Vidal
*Director of the United States Patent and Trademark Office*